Feb. 22, 1927. 1,618,860
C. S. CLARK
FUEL AND LUBRICANT SEGREGATING SYSTEM FOR INTERNAL COMBUSTION ENGINES
Filed April 24, 1925
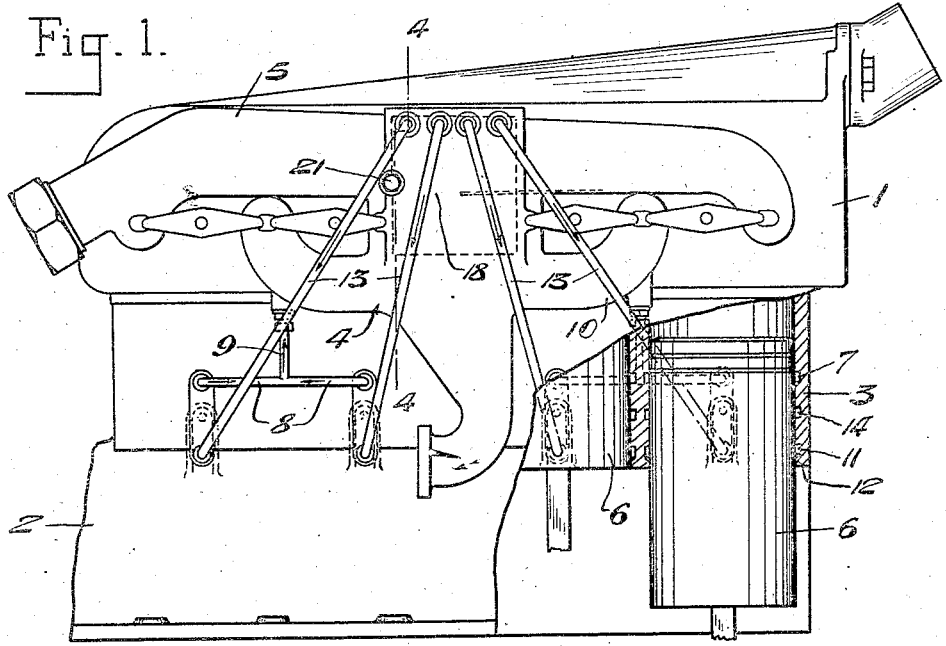
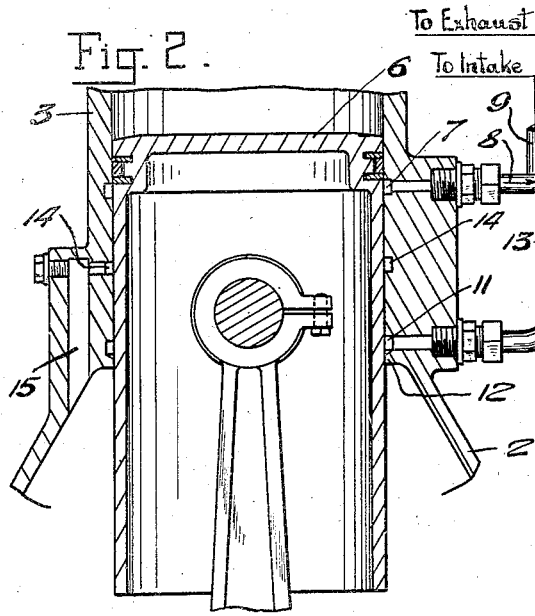
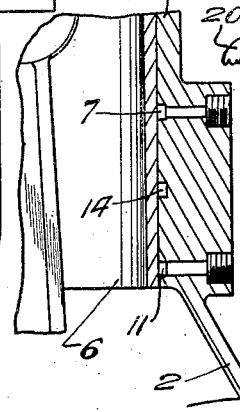
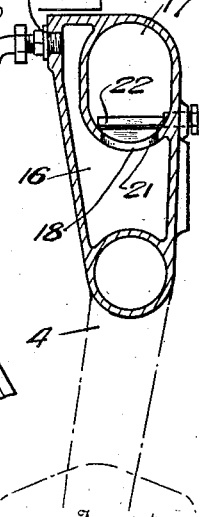
Inventor
Cornelius S. Clark
By
Attorney Patented Feb. 22, 1927.

1,618,860

UNITED STATES PATENT OFFICE.

CORNELIUS S. CLARK, OF NORFOLK, VIRGINIA, ASSIGNOR TO CLARK ENGINEERING CORPORATION, OF NORFOLK, VIRGINIA, A CORPORATION OF VIRGINIA.

FUEL AND LUBRICANT SEGREGATING SYSTEM FOR INTERNAL-COMBUSTION ENGINES.

Application filed April 24, 1925. Serial No. 25,669.

This invention relates to improvements in fuel and lubricant segregating systems for internal combustion engines and particularly, to that system described and claimed in my pending application Serial #20,569, filed April 3, 1925. The invention has for its object the promotion of economy and efficiency in the operation of internal combustion engines by controlling the leakage fluids which ordinarily traverse the joint between the cylinder and piston under the influence of the differential pressures existing in the combustion chamber and crank case. These fluids are on the one hand, the difficultly volatile condensates of the fuel which tend to leak downwardly into the crank case and to impair the lubricating quality of the oil by destroying its viscosity; and on the other hand, lubricating oil from the crank case, which is drawn upwardly into the combustion chamber, where it fouls the spark-plugs and collects in a charred deposit upon the top of the piston and walls of the cylinder head.

In my invention described and claimed in said pending application I provided grooves on the cylinder wall or piston, the upper of which functioned as a trap for the leaking fuel, said groove being connected to the intake manifold of the engine, whereby said leaking fuel was drawn by suction into the manifold, to commingle with and enrich the fuel mixture. The lower groove was designed to act as an oil interceptor collecting the leakage oil creeping upwardly between the piston and cylinder from the crank case. An intermediate groove or means was provided connected with a source of gaseous fluid pressure, such as the exhaust manifold, for interposing a superatmospheric pressure between the fuel trap and oil interceptor so as to blow the oil downwardly from said interceptor into the crank case and to blow upwardly toward the oil trap, preventing the descent of the leaking fuel.

It has been found in practice that, there being a greater drop of pressure between the pressure of the intermediate groove and the vacuum in the fuel trap than between the pressure in the intermediate groove and the atmospheric pressure in the crank case, there is a decided tendency for the gas admitted under pressure of the intermediate groove to choose the path of less resistance, and to blow upwardly, carrying with it a certain amount of lubricating oil into the liquid fuel trap. The present invention aims to correct this fault by breaking the effect of vacuum in the liquid fuel trap upon the superatmospheric pressure groove by interposing a zone of atmospheric pressure between the liquid fuel trap and the zone to which superatmospheric pressure is admitted. At the same time the invention simplifies the construction of my pending application aforesaid, by dispensing altogether with the oil interceptor.

In the drawings:—

Figure 1 is a side elevation of an internal combustion engine parts being in section and parts broken away, showing the device of my invention applied thereto.

Figure 2 is a vertical section in a diametrical plane through the cylinder and piston showing the latter at the lower end of its stroke.

Figure 3 is a detail in longitudinal section taken in a diametrical plane of a portion of the cylinder and piston showing the latter at the upper end of its stroke.

Figure 4 is a section taken along the line 4—4 of Figure 1.

Figure 5 is a perspective view of an adjustable baffle used in the exhaust manifold to control the pressure admitted to the lowermost zone between the piston and cylinder.

Referring now in detail to the several figures, the numeral 1 represents a cylinder block having a lower portion 2 which forms the upper half of the crank case. The cylinders 3 are supplied with combustible mixture through an intake manifold 4 and evacuated through an exhaust manifold 5, said manifolds being preferably cast integrally as shown so as to provide for heating of the intake manifold by the exhaust. Pistons 6 travel in the cylinders 3. The above enumerated features are common to internal combustion engines and do not in themselves constitute the present invention, except as they may be essentially combined with the novel features now to be described.

It is well understood that a differential pressure condition generally exists between the combustion chamber and crank case. The pressure of the latter is substantially that of the atmosphere while the pressure in the combustion chamber varies between wide limits, amounting to several hundred pounds per square inch at the time of explosion, and being sub-atmospheric to the extent of several pounds at the moment prior to the admission of the explosive charge. This differential pressure condition induces a tidal flow of gas or air along the annular joint between the piston and cylinder, said flow being in a downward direction when the compression of the combustion chamber is relatively high, and upward when there is a vacuum in the combustion chamber. A portion of the operative engine fluids become entrained in this tidal flow of gas and at one time or another during the stroke of the piston are carried into the combustion chamber or crank case. That is to say, when the tidal flow is downward the difficultly volatile fuel ingredients descend into the crank case, destroying the viscosity of the lubricant, while, when the tidal flow is upward, lubricating oil which has impinged upon the piston skirt in the course of functioning of the lubrication system of the engine, is drawn upwardly into the combustion chamber with the untoward results previously enumerated.

The present invention provides the cylinder wall with a groove or channel 7 extending thereabout, said channel being located in such a zone as will be overlain by the piston body during the entire length of the stroke of the piston. Said groove is connected with a conduit 8, the same being one of the branches of a manifold 9, the latter communicating with the intake manifold 10 preferably at one side thereof as shown. By this means the groove 7 is constantly subjected to the vacuum of the engine intake. An annular groove 11 is provided in the cylinder wall, lying in a zone some distance below the groove 7 and also constantly overlain by the piston throughout its range of movement. The groove 11 is preferably located very near the lower end of the cylinder, a narrow bridge or rib 12 intervening. The groove 11 is connected by a conduit 13 with the exhaust space within the exhaust manifold 5.

It is apparent therefore that the upper groove 7 is constantly subject to the suction of the intake manifold while the lower groove 11 is subject to pressure from the exhaust manifold, there being a greater pressure drop between the exhaust pressure admitted to the groove 11 and the sub-atmospheric pressure in the groove 7 then exists between the pressure in the groove 11 and the atmospheric pressure in the crank case, the tendency of the exhaust gas admitted to the pressure groove being to blow upwardly, carrying with it, as has hereinbefore stated a certain portion of the lubricating oil into the groove 7. In order to destroy the compelling effect of the vacuum upon the exhaust gas under pressure, I break the vacuum by providing an intermediate annular groove 14 and connecting the same either directly to the open atmosphere, or to the atmosphere within the crank case, by means of the channel 15. The latter expedient is preferred because the air in the crank case is free from dust and moreover, more or less charged with volatile gases given off by the heated oil in the crank case, a portion of which air finds its way into the groove 7 and afterwards mixes with the fuel in the intake manifold.

The manifold used in the present illustrative embodiment of my invention is similar in most respects to that shown and described in my pending application hereinbefore indentified and needs no detailed description further than to state that a chamber 16 is formed in said manifold communicating with the exhaust passage 17 by means of a port 18, said chamber being provided with a plurality of threaded connections 19 each of which is adapted to be coupled to a pipe 20 leading to the pressure groove of one of the cylinders. A screw bolt 21 having a flat blade 22 eccentrically formed with respect thereto is introduced into the exhaust conduit of the manifold adjacent the port 18, lying transversely thereof. Upon screwing the bolt in one or the other directions the baffle 22 may assume different positions with respect to the direction of flow of the exhaust gases through said manifold, it being designed to adjustably regulate the pressure of the exhaust gases passing into the chamber 16 and outwardly of the cylinders by way of the pipes 20.

While I have herein described and illustrated a specific embodiment of my invention it is to be understood that the principle of the invention is broad and that no limitation is presumed to be imposed upon the same except such as may be expressly defined in the appended claims.

Having described my invention what I claim as new and desire to secure by Letters Patent, is:—

1. A fuel and lubricant segregating system for internal combustion engines including a cylinder wall having three grooves between the cylinder and piston, and means connecting the uppermost of said grooves to a source of vacuum, the lowermost of said grooves to a source of superatmospheric pressure and the intermediate of said grooves to atmosphere.

2. A fuel and lubricant segregating system for internal combustion engines including a cylinder and piston, one of said members being provided with three grooves, constantly overlain by the other of said members, the uppermost of said grooves being for entrapping fuel leaking from the combustion chamber of said engine past said piston, means connecting said uppermost groove with a source of vacuum, means for connecting the lowermost of said grooves with a source of superatmospheric pressure, the intermediate of said grooves being in communication with atmosphere.

3. A fuel and lubricant segregating system for internal combustion engines including a cylinder and piston, one of said members being provided with three grooves constantly overlain by the other of said members, the uppermost groove being for entrapping fuel leaking from the combustion chamber past said piston, means for connecting said uppermost groove with the intake of said engine, means connecting the lowermost of said grooves with the exhaust of said engine, the intermediate of said grooves being in communication with the atmosphere.

4. A fuel and lubricant segregating system for internal combustion engines including a cylinder, piston and crank case, the wall of said cylinder being provided with three grooves constantly overlain by the piston, the uppermost groove being for entrapping fuel leaking from the combustion chamber past said piston, means for connecting said uppermost groove with the intake of said engine, means connecting the lowermost of said grooves with the exhaust of said engine, and means placing the intermediate of said grooves in communication with the chamber of the crank case.

5. A fuel and lubricant segregating system for internal combustion engines including a cylinder, piston and crank case, means including a connection to the intake of the engine for maintaining a zone of sub-atmospheric pressure between the piston and cylinder adjacent the upper end of said piston for drawing away liquid fuel leaking from the combustion chamber of said engine past the piston, means including a connection to the exhaust of the engine for maintaining a zone of superatmospheric pressure between the piston and cylinder at the lower end of said piston, for forcing back into the crank case lubricant leaking upwardly past said piston, and means for maintaing a zone intermediate said other zones in communication with atmosphere, for neutralizing the effect of the sub-atmospheric pressure in the uppermost zone upon the superatmospheric pressure in the lowermost zone.

In testimony whereof I have hereunto set my hand.

CORNELIUS S. CLARK.